(No Model.)
4 Sheets—Sheet 1.
W. BAUR & J. V. V. BOORAEM.
MACHINE FOR CUTTING SUGAR.
No. 349,027. Patented Sept. 14, 1886.
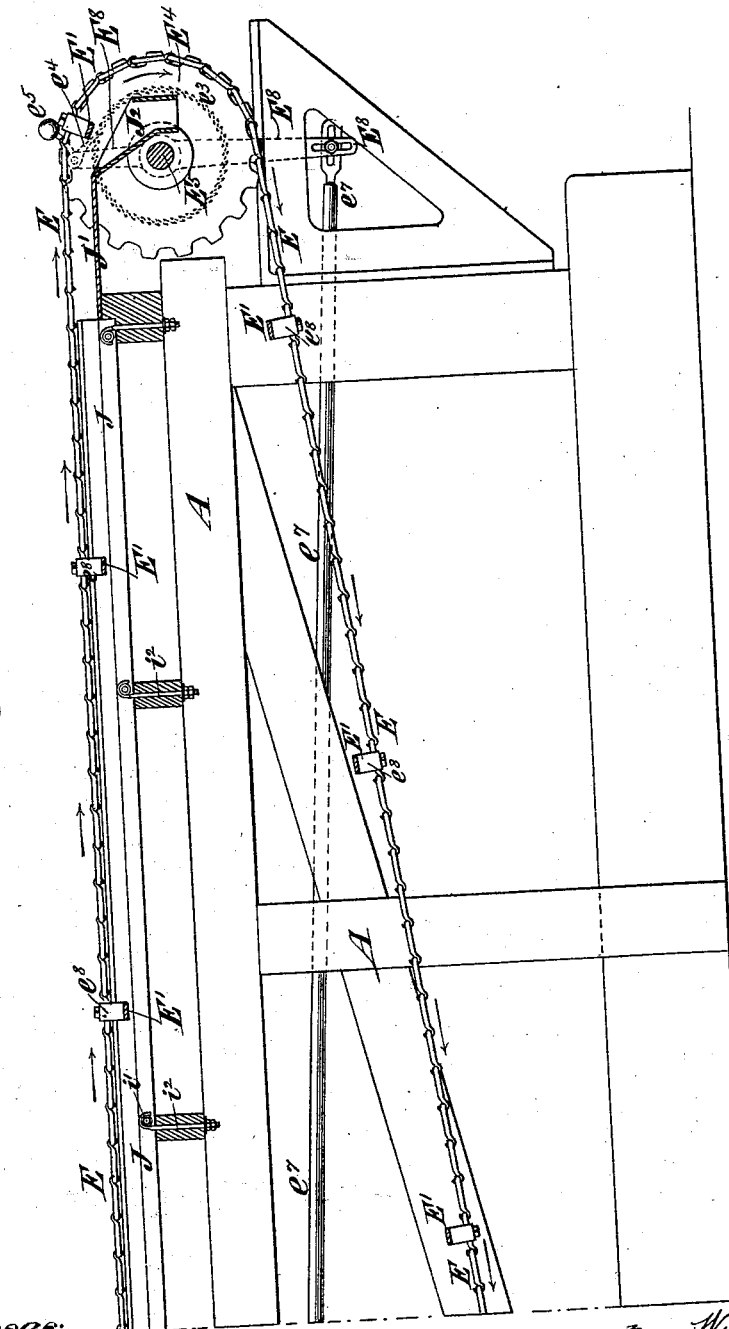

(No Model.) 4 Sheets—Sheet 2.
W. BAUR & J. V. V. BOORAEM.
MACHINE FOR CUTTING SUGAR.
No. 349,027. Patented Sept. 14, 1886.
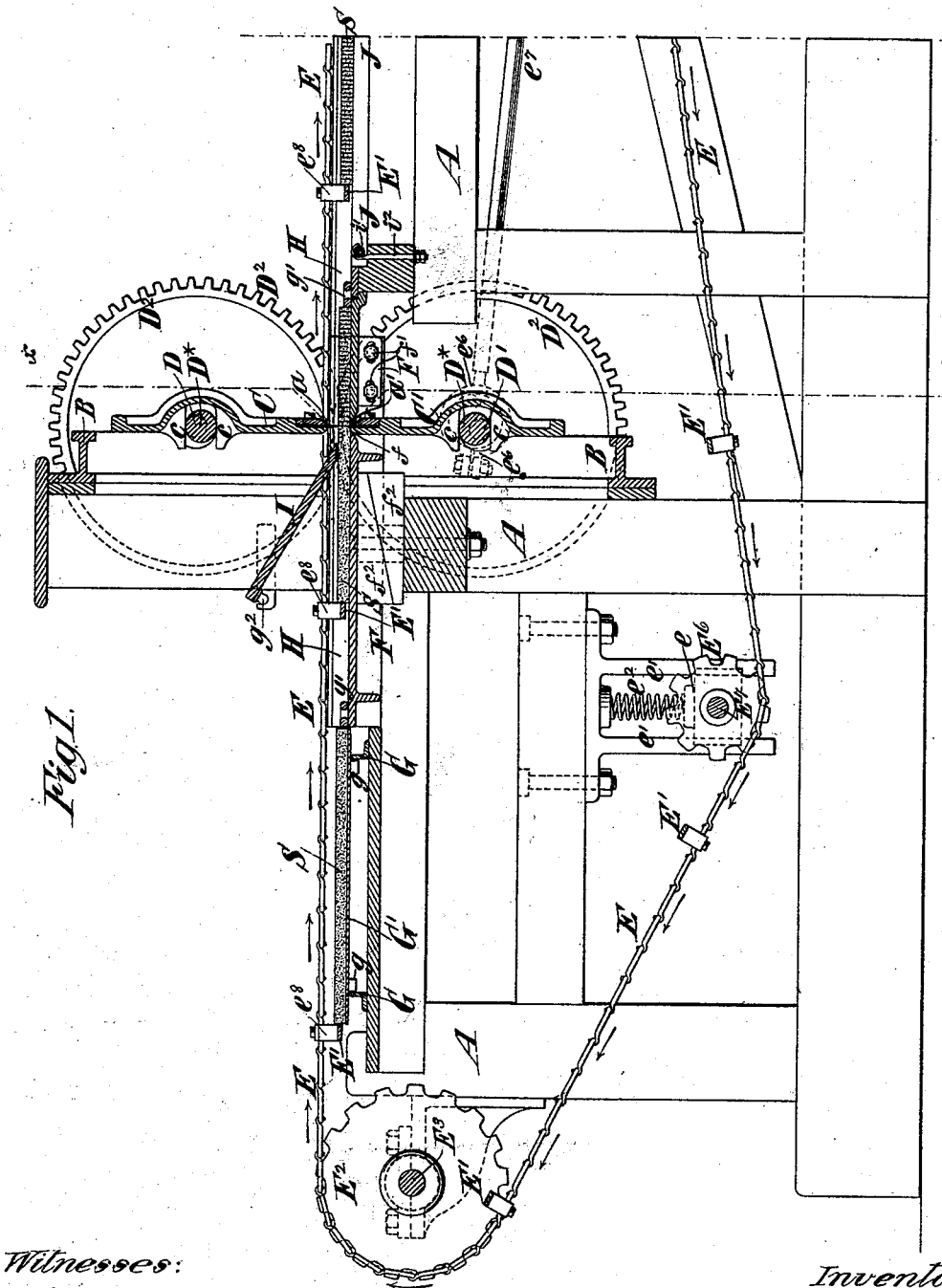

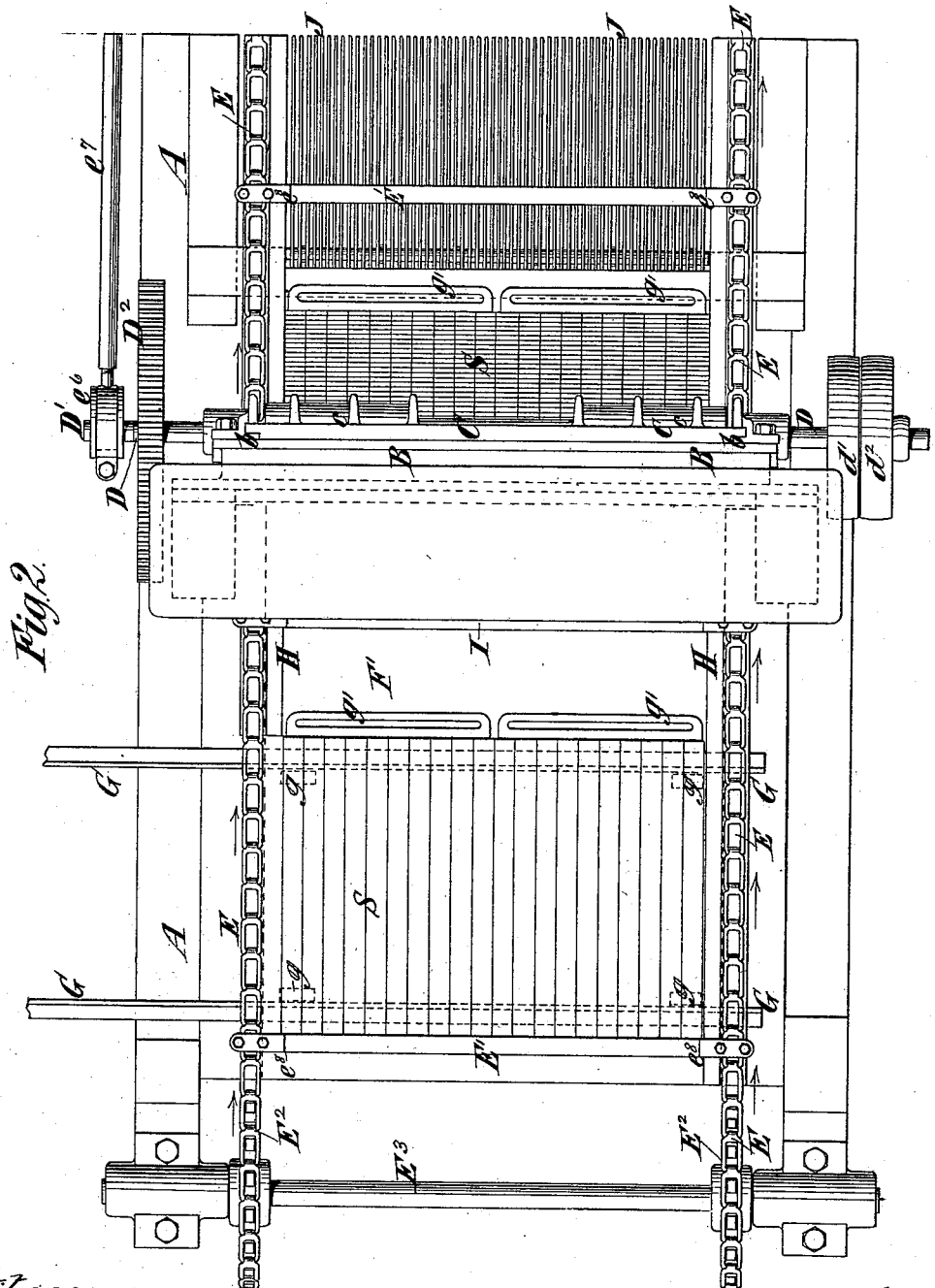

(No Model.) 4 Sheets—Sheet 4.
W. BAUR & J. V. V. BOORAEM.
MACHINE FOR CUTTING SUGAR.
No. 349,027. Patented Sept. 14, 1886.
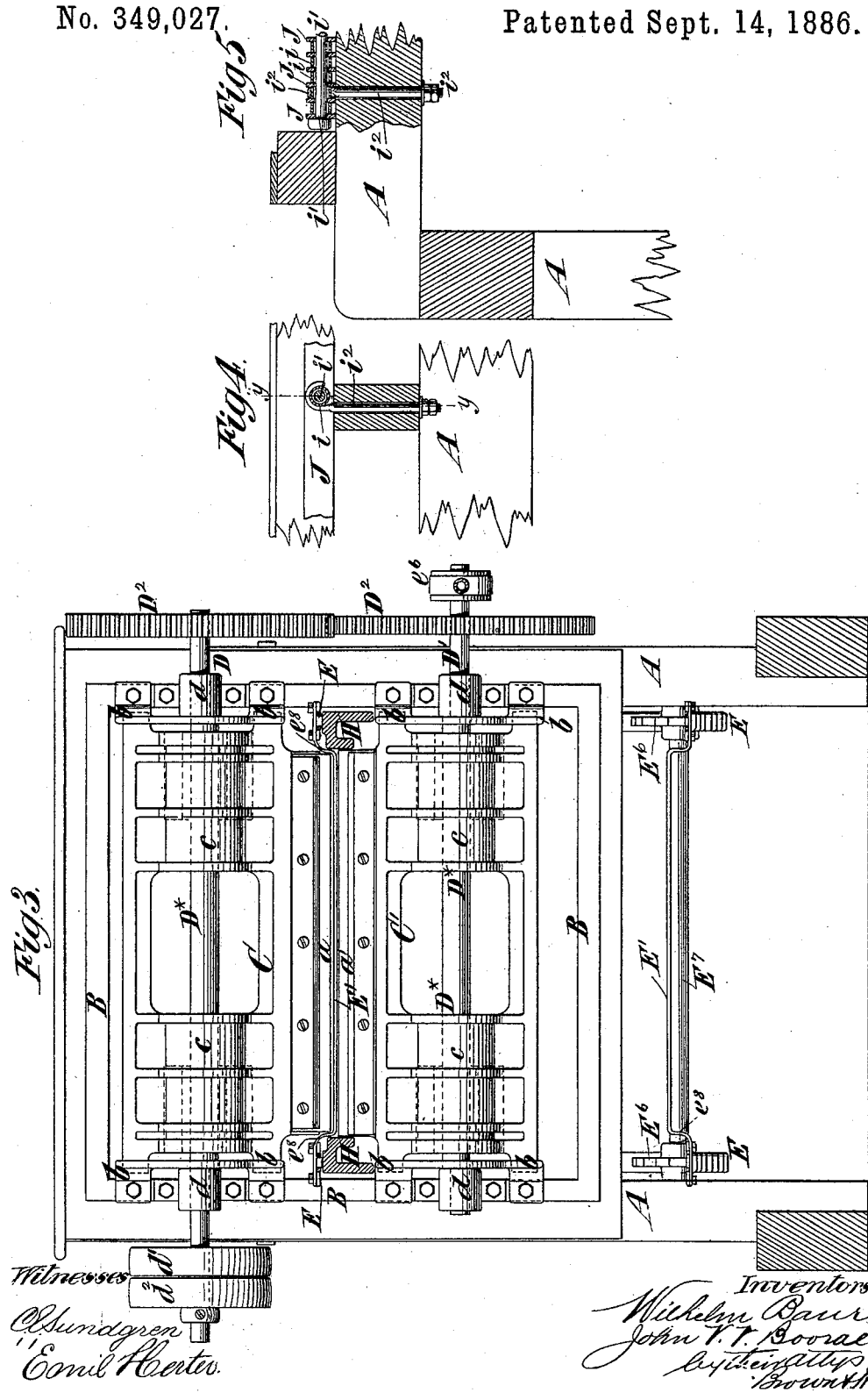

UNITED STATES PATENT OFFICE.

WILHELM BAUR AND JOHN V. V. BOORAEM, OF BROOKLYN, NEW YORK.

MACHINE FOR CUTTING SUGAR.

SPECIFICATION forming part of Letters Patent No. 349,027, dated September 14, 1886.

Application filed January 18, 1886. Serial No. 188,828. (No model.)

*To all whom it may concern:*

Be it known that we, WILHELM BAUR and JOHN V. V. BOORAEM, both of the city of Brooklyn, in the county of Kings and State of New York, have invented a new and useful Improvement in Machines for Cutting Sugar, of which the following is a specification.

The principal object of our invention is to produce a machine for economically and readily cutting up slabs or bars of sugar to produce what we term "tablet sugar" or "domino sugar," the pieces into which the sugar is cut being about the size and shape of dominoes. The machine may, however, be employed in cutting up sugar into pieces of different sizes and shapes.

In carrying out our invention we employ a reciprocating knife or cutter, or a pair of reciprocating knives or cutters, placed opposite each other and working toward and from each other in the same plane; and we also employ endless travelers, which may consist of chains or belts, and which are connected at proper intervals by cross-bars, which strike against and carry forward to the cutter or cutters the sugar placed in front of them.

The sugar to be cut up in the machine consists of slabs or bars which are arranged parallel and side by side upon a supporting-plate, and we provide tracks or ways which extend transversely to the line of movement of the endless travelers, on which the plate with the sugar supported upon it may be slid in under the travelers and brought in front of a cross-bar, which carries the sugar forward or from the plate by pressing against the ends of the slabs or bars. The reciprocating cutter or cutters have forward and in rear of them a stationary bed, and the plate which is slid in transversely beneath the travelers has its upper surface flush with the adjacent end of the stationary bed, so that the slabs or bars of sugar can slide readily forward from the supporting-plate onto the bed. The cross-bars which connect the endless travelers are depressed below the travelers between their ends, so that they will be in the same plane with the sugar which is shoved into place below the travelers. We also employ side guides, between which the sugar passes, and between which the upper and lower cutters reciprocate, and the upper cutter should be of such length as to enable the offset portions which are at the ends of the depressed cross-bars to pass between the ends of the upper cutter and the side guides.

In order to hold the pieces first cut from the slabs or bars and to prevent their tumbling over we place movable weights upon the stationary bed in front of the sugar, and as the sugar is carried forward by the traveling cross-bars these weights are also carried forward and serve to prevent the sugar from becoming displaced. We also employ adjacent to and behind the cutter a weight, which may consist of a plate pivoted at its rear edge and bearing at its front edge upon the sugar, and this weight serves to prevent the sugar from being lifted by the upper cutter and to prevent the sugar from being carried too far ahead by the step-by-step movement which it receives from the traveling carriers. In advance of the cutter or cutters we place a grating, over which the cut sugar is carried, and which enables the dust and fine chips to drop away from the sugar, and this grating may consist of parallel bars arranged near together and extending in the direction of movement of the endless travelers.

The invention consists in novel combinations of parts, which are hereinabove briefly referred to, and are hereinafter fully described and pointed out in the claims.

In the accompanying drawings, Figure 1, which is made on two sheets because of the length of the machine, represents a vertical longitudinal section of a machine embodying our invention. Fig. 2 is a plan of a portion of the machine including the feeding end thereof. Fig. 3 is a vertical section of the machine upon the plane of the dotted line *x x*, Fig. 1. Fig. 4 is a detailed view upon a larger scale, illustrating the construction of the grating and the manner of securing in place the bars which compose it; and Fig. 5 is a sectional elevation upon the plane of the dotted line *y y*, Fig. 4, and upon the same scale.

Similar letters of reference designate corresponding parts in all the figures.

A designates the frame of the machine, which may be of any suitable construction and of wood or metal; and B designates an upright rectangular frame, which is of metal, and serves to support the reciprocating cross-heads for the two cutters and the shafts, whereby they are operated. We have here represented upper and lower cutters, $a\ a'$, which are severally secured to cross-heads C C', and these cross-heads have a sliding vertical movement in suitable guides, $b$, secured to the frame B.

D D' represent parallel shafts arranged one above another and supported in boxes $d$, attached to the frame B, and, as here represented, geared together by spur-wheels $D^2$, as shown in Fig. 3. In this example of our invention the upper shaft, D, constitutes the driver, and is provided with fast and loose pulleys $d'\ d^2$, for the reception of the driving-belt. The shafts D D' are constructed with cam-like or eccentric portions $D^3$, which operate in boxes or forks $c$, formed upon the rear sides of the cross-heads C C', and by the rotation of the shafts the two cross-heads are moved simultaneously toward and from each other.

In lieu of two knives, a single knife or cutter only might be employed, but we prefer to employ oppositely-arranged cutters, as here represented.

In order to present the sugar to the cutters, we employ endless travelers E, which have extending between and connecting them cross-bars E'. These travelers pass over idler or supporting wheels $E^2$, arranged upon a shaft, $E^3$, at one end of the machine, and over driving-wheels $E^4$, arranged upon a driving-shaft, $E^5$, at the other end of the machine. The endless travelers and their cross-bars have a movement imparted to them in the direction of the arrows shown in Fig. 1, to carry the sugar forward to the cutter or cutters, and in their return movement they pass under tension-wheels $E^6$ on a shaft, $E^7$, which is supported in boxes $e$, having a rising-and-falling movement in slideways $e'$, depending from the frame of the machine. The boxes $e$ are pressed downward by springs $e^2$, and the springs and wheels preserve a proper tension in the endless travelers E.

In order to impart a proper step-by-step motion to the endless travelers and their cross-bars, so that the sugar will be moved forward during the time when the cutters are forced apart and will be left stationary when the cutters advance into and operate on the sugar, any suitable mechanism may be employed. We have here represented a ratchet-wheel, $e^3$, upon the shaft $E^5$, and the lever $E^8$, fulcrumed loosely on said shaft and carrying at its upper end a pawl, $e^4$, which, by means of a weight, $e^5$, is held in operative engagement with the wheel $e^3$.

On the lower cutter-shaft, D', is an eccentric, $e^6$, which, by means of a rod, $e^7$, transmits a swinging movement to the lever $E^8$ and causes the pawl $e^4$ to turn the shaft $E^5$ and wheels $E^4$ periodically, and so move the endless travelers and their cross-bars with a step-by-step or intermittent movement.

As represented in Fig. 1, the lower cutter, $a'$, operates through a throat, $f$, in the stationary bed, which is here shown as made in two parts, F F', arranged in front of and in rear of the cutters. As here represented, one of the parts, F, of the bed is secured in place by bolts $f'$, passing through slots, as shown in Fig. 1, and is thereby adjustable toward and from the part F' of the bed, in order to properly regulate the width of the throat $f$. The height of the bed may be regulated by wedges $f^2$, arranged one on another, as shown in Fig. 1.

In order to introduce the sugar into proper position to be carried forward by the cross-bars E', we have represented tracks G, which extend transversely to the line of movement of the endless travelers, as shown in Figs. 1 and 2, and we employ plates G', arranged to slide upon these tracks and below the endless travelers E. The plates G' may be provided with snugs or projections $g$ on their under sides, as shown in Fig. 1, which engage the tracks G, and serve to hold the plate in proper position on the tracks as it is slid on the tracks beneath the travelers.

The travelers E may consist of chains, as here represented, or they may consist of endless belts or cables or any analogous endless traveling carriers. The arrangement of the tracks G is such that the plate G' may be slid horizontally upon them beneath the traveler E, and so that the upper surface of the plate will be coincident or flush with the adjacent end of the bed F', and the cross-bars E' are depressed between the carriers and throughout nearly their entire length, so that they will come in the same plane with the sugar S, supported upon the plate G', as shown in Figs. 1 and 2.

When the machine is to be employed for cutting domino or tablet sugar, the sugar, as introduced into the machine, will be in the form of slabs or bars, as shown in Fig. 2, and these slabs or bars are arranged close together side by side with their length parallel with the direction of movement of the travelers E. The plate G', having the bars of sugar thus arranged upon it, is slid in upon the tracks G to a position midway between the traveling carriers and between the side guides, H, and the next cross-bar E', which advances, will strike the ends of all the bars or slabs simultaneously, as shown in Figs. 1 and 2, and will push them forward together between the side guides, H, and present them to the reciprocating cutters $a\ a'$.

In order to prevent the first pieces of sugar cut from being tumbled over and displaced, we place in front of the sugar, and upon the bed portion F', movable weights $g'$, as here shown in Figs. 1 and 2, and these weights are advanced with and in front of the sugar. The cutters $a\ a'$ are not endangered by the weights $g'$, because the space between the cutters is sufficient for the thin weights to pass through.

In order to hold the sugar against being lifted by the upper cutter, $a$, as it recedes, we have represented in rear of the cutters a weight, I, which, as shown, consists merely of a plate pivoted at its rear edge, $g^2$, and resting with its forward edge upon the sugar. This weight not only serves to prevent the lifting of the sugar by the cutter, but it also acts as a retarder and prevents the sugar from being carried forward by its momentum induced by the step-by-step motion of the travelers E.

By the operation of the cutters the slabs or bars of sugar are cut up into thin tablets, which are still carried forward by the cross-bars E', as shown in Fig. 1. As before stated, the cross-bars E' are depressed throughout nearly their entire length, in order to bring them in a plane with the sugar when supported upon the plate G', and this depression produces offsets in the ends of the bar, as shown at $e^3$ in Fig. 3. These offsets must pass between the side guides, H, and while the lower cutter, $a'$, is made of a length to about fill the space between the side guides, as shown in Fig. 3, the upper cutter, $a$, is made shorter, so as to enable the offsets $e^3$ in the cross-bars E' to pass between the ends of the upper cutter, $a$, and the side guides, as shown in Fig. 3.

In order to enable the cut sugar to free itself from dust and fine chips, we provide in front of the cutters a grating, J, which allows dust and fine chips to drop away from the cut sugar. As here represented, this grating J consists of thin bars of metal arranged side by side at a little distance apart and in the direction of travel of the sugar. As shown best in Figs. 4 and 5, the bars are arranged near together, with thimbles $i$ interposed between them to hold them at the proper distance apart, and bolts $i'$ inserted through the bars and thimbles throughout the width of the series of bars. The grating thus constructed may be held down in place by hooked bolts $i^2$, engaging the thimbles $i$ between the bars, as shown in Figs. 4 and 5.

At the delivery end of the machine shown in Fig. 1 the ends of the bars which form the grating J are flush with the delivery-plate J', which terminates in a chute, J², and through this the cut sugar may be delivered into the barrels or other receptacles in which it is to be packed for shipment. As we prefer, however, to pack sugar cut in this form in layers in boxes for shipment, we may remove the cut sugar from the grating by a plate or tray—such, for example, as the tray shown in our application for United States Letters Patent, Serial No. 188,829, filed January 18, 1886.

What we claim as our invention, and desire to secure by Letters Patent, is—

1. The combination, with a reciprocating cutter and endless travelers connected by cross-bars which carry the sugar forward to the cutter, of tracks extending transversely to the direction of movement of the travelers and beneath them, whereby provision is afforded for sliding beneath the travelers plates on which the sugar is supported, substantially as herein described.

2. The combination, with a reciprocating cutter and endless travelers connected by cross-bars which carry the sugar forward, of tracks extending transversely to the direction of movement of the travelers and beneath them, the cross-bars being depressed below the line of travel of the travelers so as to occupy the same plane as the sugar introduced beneath the travelers, substantially as herein described.

3. The combination, with a reciprocating cutter and the endless travelers E and their cross-bars E', of the transverse tracks or ways G below the travelers, and the plates G', having snugs or projections $g$, which engage with the tracks and hold the plates in proper position thereon, substantially as herein described.

4. The combination, with a reciprocating cutter and endless travelers connected by cross-bars for carrying the sugar to the cutter, of a stationary bed forward and in rear of the cutter for supporting the sugar during the cutting operation, the transverse tracks G below the travelers, and the plate G', sliding on the tracks and having its upper surface flush with the adjacent end of the stationary bed, substantially as herein described.

5. The combination, with a reciprocating cutter and endless travelers connected by cross-bars for carrying the sugar forward, of the stationary bed for the sugar during cutting, movable weights $g'$, placed thereon in advance of the sugar, transverse tracks G, and the plate G', sliding thereon, substantially as herein described.

6. The combination, with a reciprocating cutter and endless travelers connected by cross-bars for carrying the sugar forward, of a grating in front of the cutter and over which the cut sugar passes to its point of delivery, and is thereby freed from dust and fine chips, substantially as herein described.

7. The combination, with a reciprocating cutter and endless travelers connected by cross-bars for carrying the sugar forward, of a grating composed of parallel bars extending in the direction of movement of the travelers and over which the cut sugar passes to a point of delivery, and is thereby freed from dust and chips, substantially as herein described.

8. The combination, with a reciprocating cutter and a bed for supporting the sugar while being cut, of endless travelers connected by cross-bars, which, by coming behind the sugar, move it forward, and a weight arranged above the bed and under which the sugar passes, and which rests upon the sugar to prevent its lifting and to prevent its being thrown ahead by momentum, substantially as herein described.

9. The combination, with the side guides, H, and the upper and lower cutters, $a\ a'$, entering between the guides, of the endless travelers and cross-bars connecting them and depressed between them so as to pass between the cutters, the upper cutter being of a length to enable the offsets at the ends of the cross-bars to pass it, substantially as herein described.

WILHELM BAUR.
J. V. V. BOORAEM.

Witnesses to the signature of Wilhelm Baur:
C. BORNGRAEBER,
GEORG BEUCHELT.

Witnesses to the signature of J. V. V. Booraem:
FREDK. HAYNES,
MINERT LINDEMAN.